(12) United States Patent
Singh et al.

(10) Patent No.: US 12,007,470 B2
(45) Date of Patent: Jun. 11, 2024

(54) SENSOR AUTO-LOCATION USING PHASED ANTENNA ARRAY BEAMFORMING

(71) Applicant: SENSATA TECHNOLOGIES, INC., Attleboro, MA (US)

(72) Inventors: Ravindra P. Singh, Antrim (GB); Jonathan E. Barr, Magherafelt (GB); A. Tugay Arslan, Antrim (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 218 days.

(21) Appl. No.: 17/580,822

(22) Filed: Jan. 21, 2022

(65) Prior Publication Data

US 2022/0236405 A1      Jul. 28, 2022

Related U.S. Application Data

(60) Provisional application No. 63/140,582, filed on Jan. 22, 2021.

(51) Int. Cl.
*B60C 23/00* (2006.01)
*G01S 13/76* (2006.01)
*H01Q 3/26* (2006.01)

(52) U.S. Cl.
CPC .......... *G01S 13/767* (2013.01); *G01S 13/765* (2013.01); *H01Q 3/267* (2013.01)

(58) Field of Classification Search
CPC .. G01S 13/767; G01S 13/765; G01S 5/02521; H01Q 3/267; B60C 23/0416; B60C 23/0444; B60C 23/045; H04B 7/0617

USPC ......................... 340/447, 442, 449, 445, 444
See application file for complete search history.

(56) References Cited

U.S. PATENT DOCUMENTS

| 9,950,577 B1 * | 4/2018 | Marlett ................... H04W 4/40 |
| 2005/0192727 A1 | 9/2005 | Shostak et al. |
| 2007/0159315 A1 | 7/2007 | Murata et al. |
| 2018/0111429 A1 * | 4/2018 | Matsuoka ............ H04B 17/318 |
| 2018/0361803 A1 * | 12/2018 | Saburi ................. B60C 23/0442 |
| 2019/0152277 A1 * | 5/2019 | Hassani .............. B60C 23/0437 |

OTHER PUBLICATIONS

Extended European Search Report, EP22152824.3, dated Jun. 15, 2022, 7 pages.

* cited by examiner

*Primary Examiner* — Anh V La
(74) *Attorney, Agent, or Firm* — Mark H. Williams (57) ABSTRACT

Methods, systems, apparatuses, and computer program products for sensor auto-location using phased antenna array beamforming are disclosed. In a particular embodiment, a method of sensor auto-location using phased antenna array beamforming includes sending a radio frequency (RF) signal beam directed towards a given tire placement direction of a vehicle. In this embodiment, the method includes receiving an acknowledgement from a sensor and determining whether one or more signal attributes indicated in the acknowledgement are within one or more predefined ranges for the one or more signal attributes and corresponding to the given tire placement direction. In response to the one or more signal attributes being within the one or more predefined ranges, the method includes determining that the sensor is fitted on the given tire placement direction.

14 Claims, 9 Drawing Sheets

SENSOR AUTO-LOCATION USING PHASED ANTENNA ARRAY BEAMFORMING

CROSS-REFERENCE TO RELATED APPLICATIONS

This application is a non-provisional application for patent entitled to a filing date and claiming the benefit of earlier-filed U.S. Provisional Patent Application Ser. No. 63/140,582, filed Jan. 22, 2021, the contents of which are herein incorporated by reference in their entirety.

BACKGROUND

Tire pressure monitoring systems (TPMS) employ complex algorithms which, by using automatic braking system (ABS) data and tire drive information, auto-locate the position of each sensor within a few of minutes of a drive cycle. Auto-locating the position of the sensor during the drive cycle eliminates the need for identification of tire sensor location at the time of fitting. Though the TPMS sensor locating process has been automated it still requires customer to drive the car for a given amount of time before the TPMS sensor location can be accurately determined.

SUMMARY

Methods, systems, apparatuses, and computer program products for sensor auto-location using phased antenna array beamforming are disclosed. In a particular embodiment, a method of sensor auto-location using phased antenna array beamforming includes sending a radio frequency (RF) signal beam directed towards a given tire placement direction of a vehicle. In this embodiment, the method includes receiving an acknowledgement from a sensor and determining whether one or more signal attributes indicated in the acknowledgement are within one or more predefined ranges for the one or more signal attributes and corresponding to the given tire placement direction. In response to the one or more signal attributes being within the one or more predefined ranges, the method includes determining that the sensor is fitted on the given tire placement direction.

In another embodiment, an apparatus for sensor auto-location using phased antenna array beamforming is disclosed. In this embodiment, the apparatus is configured for perform steps of sending a radio frequency (RF) signal beam directed towards a given tire placement direction of a vehicle and receiving, in response to the RF signal beam, an acknowledgement from a sensor. According to this embodiment, the apparatus is configured to perform steps of determining whether one or more signal attributes indicated in the acknowledgement are within one or more predefined ranges for the one or more signal attributes and corresponding to the given tire placement direction. In response to the one or more signal attributes being within the one or more predefined ranges, the apparatus determines that the sensor is fitted on the given tire placement direction.

In another embodiment, a non-transitory computer readable medium stores instructions for sensor auto-location using phased antenna array beamforming that, when executed by a computer, cause the computer to perform steps sending a radio frequency (RF) signal beam directed towards a given tire placement direction of a vehicle and receiving, in response to the RF signal beam, an acknowledgement from a sensor. In this embodiment, the computer readable medium includes instructions that when executed by the computer cause the computer to determine whether one or more signal attributes indicated in the acknowledgement are within one or more predefined ranges for the one or more signal attributes and corresponding to the given tire placement direction. In this embodiment, the computer readable medium includes instructions that when executed by the computer cause the computer to in response to the one or more signal attributes being within the one or more predefined ranges, determine that the sensor is fitted on the given tire placement direction.

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Tire pressure monitoring systems (TPMS) have been an integral part of cars in most parts of the world for many years. Initially when this feature was introduced it only was used to give an indication that one of the tires has low pressure by indicating a lamp on car's dashboard. As technology progressed within cars, the position of TPMS sensors fitted on each tire of the car were indicated by using external tools at the time of fitting so that the car dashboard UI could tell the customer which tire has low pressure. Currently TPMS employ complex algorithms which, by using automatic braking system (ABS) data and tire drive information, could auto-locate the position of each sensor within a few of minutes of a drive cycle. This eliminates the need for identification of tire sensor location at the time of fitting.

Though the TPMS sensor locating process has been automated it still requires a customer to drive the car for a given amount of time before the TPMS sensor location can be accurately determined. This puts a limitation where accurate tire pressure cannot be updated and presented when a customer has just started using the new car or started using the car after new set of tire sensors has been installed. According to embodiments of the present disclosure, the tire sensor location may be learned while the car is parked by a RF beamforming feature using a phased antenna array at a high frequency range. The beamforming technique allows an RF transceiver to transmit a beam of RF signal in a specific direction. Using this technique, an RF signal beam may be transmitted in the direction of each tire one by one. An RF receiver fitted in the TPMS sensor can acknowledge the reception of the signal and send back an acknowledgement message confirming sensor identification for given tire.

Figure 1A:
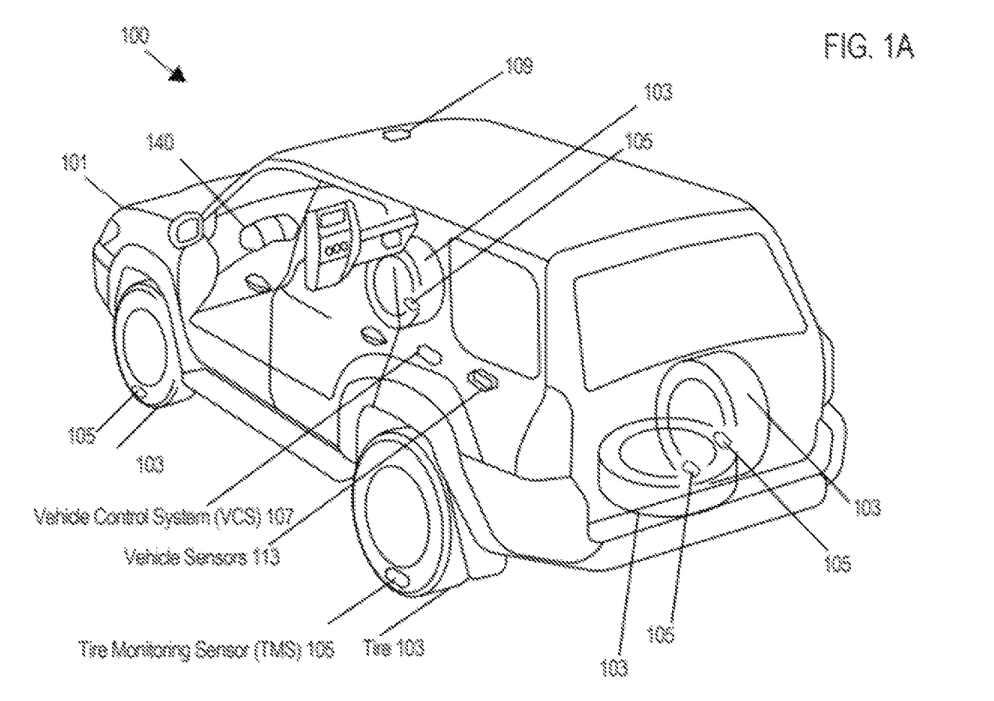
FIG. 1A shows an example isometric view of a car for sensor auto-location using phased antenna array beamforming according to some embodiments of the present disclosure.
Figure 1B:
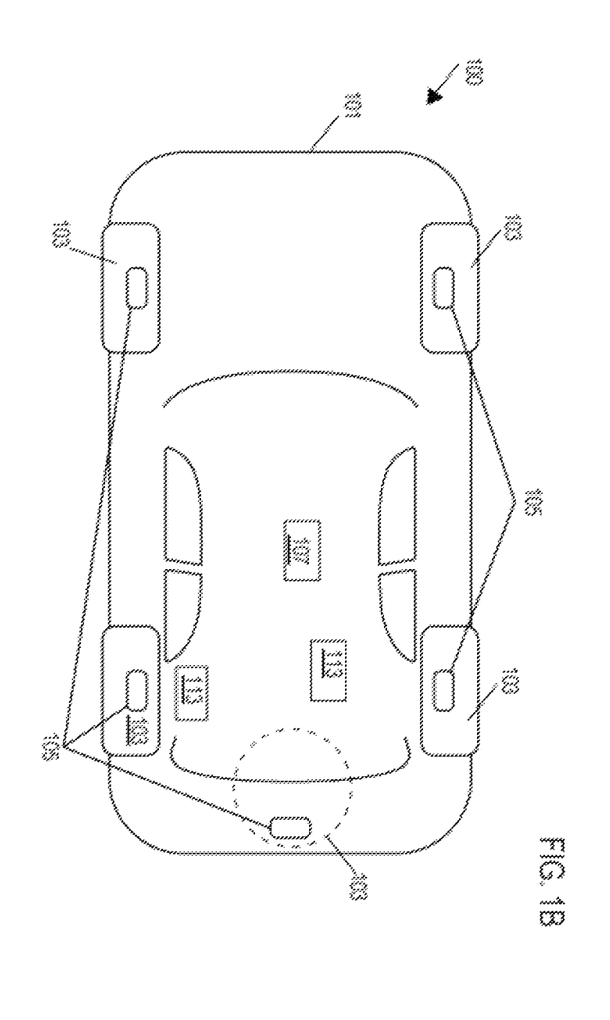
FIG. 1B shows an example overhead view of a car for sensor auto-location using phased antenna array beamforming according to some embodiments of the present disclosure.

Exemplary methods, apparatuses, and computer program products for sensor auto-location using phased antenna array beamforming in accordance with the present disclosure are described with reference to the accompanying drawings, beginning with FIG. 1A. FIG. 1A sets forth an isometric diagram of a system (100) for sensor auto-location using phased antenna array beamforming in accordance with the present disclosure. FIG. 1B sets forth a top view of the system of FIG. 1A. The system of FIGS. 1A and 1B includes a vehicle (101) equipped with tires (103) that include tire monitoring sensors (TMS) (105). A TMS is a sensor that is configured to monitor and transmit parameters of a tire. According to embodiments of the present disclosure, a TMS may be coupled to some portion of the tire (e.g., mounted to an inner portion of the tire). In at least one embodiment, the TMS may be coupled to a valve stem of the tire. As will be explained in greater detail below, a TMS may transmit tire parameters to a receiver of a tire pressure monitoring system (TPMS).

The vehicle of FIGS. 1A and 1B further includes a vehicle control system (VCS) (107) that controls various components and systems within a vehicle. In a particular embodiment, the VCS (107) includes a plurality of electronic control units (ECUs) that are configured to control one or more vehicle subsystems. Commonly referred to as the vehicle's "computers", an ECU may be a central control unit or may refer collectively to one or more vehicle subsystem control units, such as an Engine Control Module (ECM), a Powertrain Control Module (PCM), a Transmission Control Module (TCM), a Brake Control Module (BCM), a Central Timing Module (CTM), a General Electronic Module (GEM), or a Suspension Control Module (SCM). In an embodiment according to the present disclosure, the VCS (107) includes a BCM that includes an Antilock Braking System (ABS) and an Electronic Stability Program (ESP). Alternatively, the VCS (107) may comprise a Telematics Control Unit (TCU) independent of vehicle-based sensors (e.g., an aftermarket system). In the example of FIGS. 1A and 1B, the vehicle (101) includes a dashboard display screen (120) for displaying messages from the VCS (107). For example, the VCS (107) may send a 'low tire pressure' message to a component connected to the dashboard display screen (120). In this example, in response to receiving the 'low tire pressure' message, the component may turn on a 'low tire pressure' indicator that is displayed on the dashboard display screen (120).

Each TMS (105) may be equipped with a wireless transceiver for bidirectional wireless communication with the VCS (107), as will be described in more detail below. The VCS is similarly equipped with a wireless transceiver for bidirectional wireless communication with each of the TMSs (105), as will be described in more detail below. The bidirectional wireless communication may be realized by low power communication technology such as Bluetooth Low Energy or other low power bidirectional communication technology that is intended to conserve the amount of energy consumed. Alternatively, each TMS (105) may include a unidirectional transmitter configured to transmit signals to the VCS (107). In some embodiments, each TMS (105) may communicate directly with a smart device (not shown), such as a smart phone, tablet, or diagnostic tool, as will be described in more detail below.

Each vehicle system may include sensors (113) used to measure and communicate vehicle operating conditions. For example, the ABS may include wheel speed sensors on the wheelbase used to measure wheel speed. The ESP subsystem may include yaw rate sensors configured to measure the yaw-induced acceleration of the vehicle when the vehicle is maneuvering a curve. Readings from such sensors (113) may be provided to the VCS (107), which may provide parameters based on these readings to the TMS (105).

The vehicle (101) may further include a transceiver (109) communicatively coupled to the VCS (107) for cellular terrestrial communication, satellite communication, or both.

The arrangement of devices making up the exemplary system illustrated in FIGS. 1A and 1B are for explanation, not for limitation. Data processing systems useful according to various embodiments of the present disclosure may include additional servers, routers, other devices, and peerto-peer architectures, not shown in FIGS. 1A and 1B, as will occur to those of skill in the art. Networks in such data processing systems may support many data communications protocols, including for example TCP (Transmission Control Protocol), IP (Internet Protocol), Bluetooth protocol, Near Field Communication, Controller Area Network (CAN) protocol, Local Interconnect Network (LIN) protocol, FlexRay protocol, and others as will occur to those of skill in the art. Various embodiments of the present disclosure may be implemented on a variety of hardware platforms in addition to those illustrated in FIGS. 1A and 1B.

Figure 2:
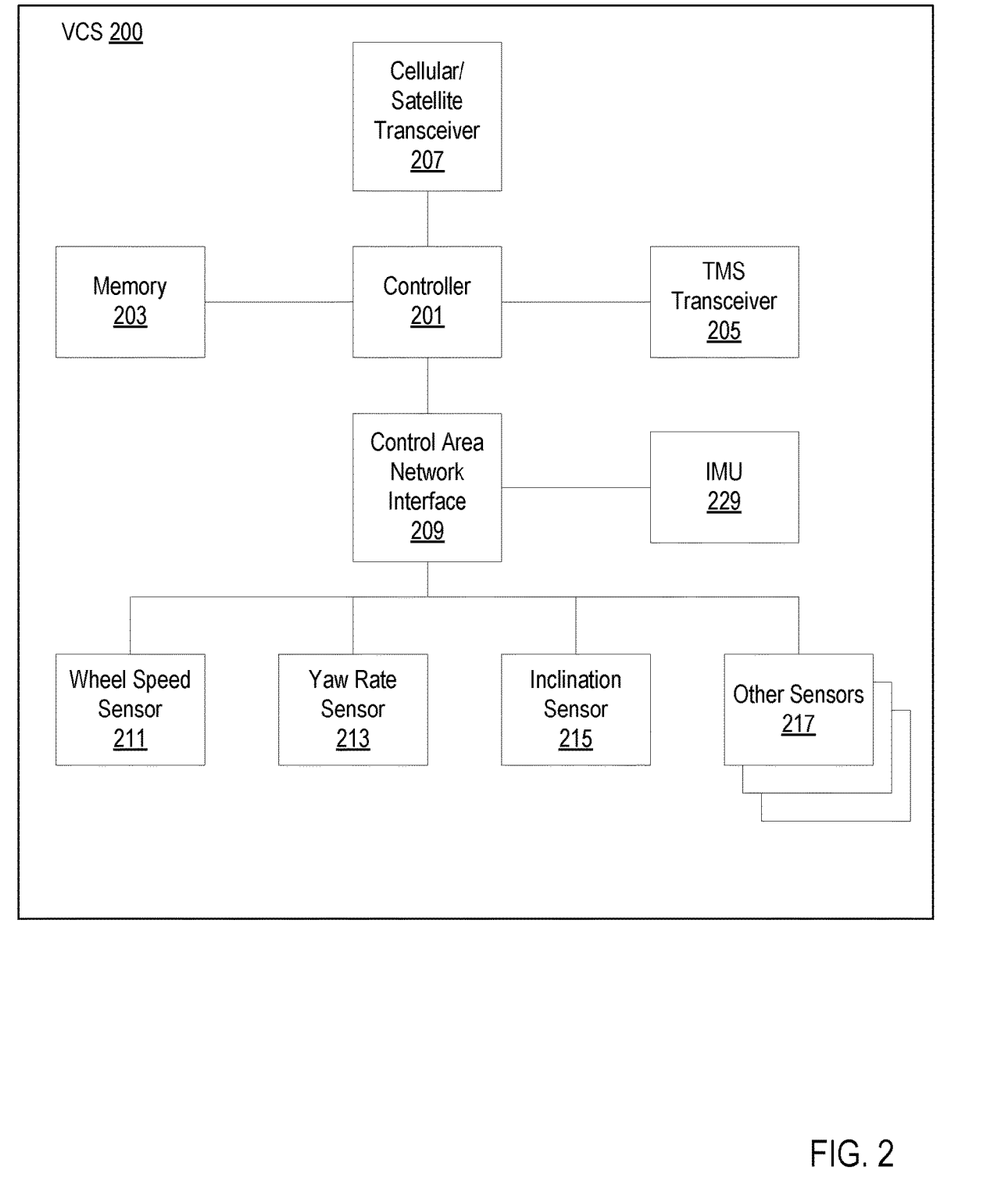
FIG. 2 is a block diagram of an example vehicle control system for sensor auto-location using phased antenna array beamforming according to some embodiments of the present disclosure.

For further explanation, FIG. 2 sets forth a diagram of an exemplary vehicle control system (VCS) (200) for sensor auto-location using phased antenna array beamforming according to embodiments of the present disclosure. The VCS (200) includes a controller (201) coupled to a memory (203). The controller (201) is configured to obtain sensor readings related to vehicle operating conditions, as well as data from sources external to the vehicle, and provide configuration parameters to a TMS, such as TMS (300) (see FIG. 3). The controller may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The sensor readings and data, as well as tire feature data received from the TMS, may be stored in the memory (203). The memory (203) may be a non-volatile memory such as flash memory. For example, the VCS (200) may obtain vehicle operating condition data, such as sensor readings from sensors on-board the vehicle.

For bidirectional wireless communication with a TMS, the VCS (200) includes a TMS transceiver (205) coupled to the controller (201). In one embodiment, the TMS transceiver (205) is a Bluetooth Low Energy transmitter-receiver. In other embodiments, the TMS transceiver (205) may be other types of low power radio frequency communication technology that is intended to conserve energy consumed in the TMS. The VCS (200) may further include a transceiver (207) for cellular terrestrial communication, satellite communication, or both. In some examples, the VCS (200) communicates with a cloud-based server to transmit sensor readings and tire feature data, and to receive an analytical result.

The VCS (200) may further comprise a controller area network (CAN) interface (209) for communicatively coupling vehicle sensors and devices to the controller (201). Of particular relevance to the present disclosure, the CAN interface (209) couples a wheel speed sensor (211), a yaw rate sensor (213), an inclination sensor (215), and other sensors (217), to the controller (201). The wheel speed sensor (211) measures the rotational angular speed of the wheel, e.g., in radians per second. The yaw rate sensor (213) may be used to measure the yaw-induced acceleration of the vehicle, for example, when the vehicle is maneuvering a curve, which will influence the magnitude of loading on each tire. The yaw rate sensor (213) may also provide information on the shear forces on the tire where it contacts the road. The inclination sensor (215) may detect longitudinal and/or transverse inclination of the vehicle. The wheel speed sensor (211), the yaw rate sensor (213), and the inclination sensor (215) transmit respective readings to the controller (201). In some examples, an inertial measurement unit (IMU) (229) is configured to measures a vehicle's specific force, angular rate, and/or orientation using a combination of accelerometers, gyroscopes, and/or magnetometers.

Figure 3:
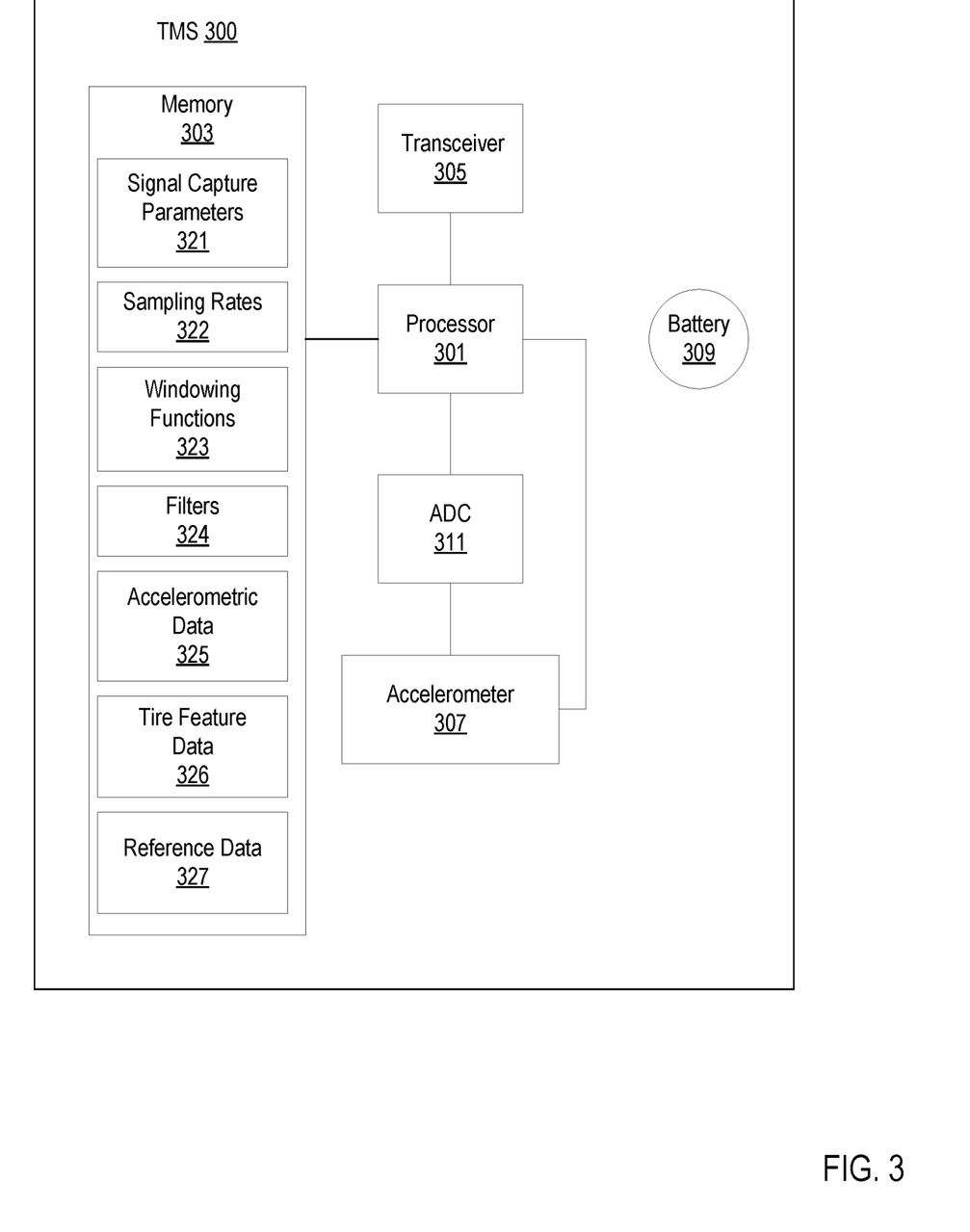
FIG. 3 is a block diagram of an example tire monitoring sensor for sensor auto-location using phased antenna array beamforming according to some embodiments of the present disclosure.

For further explanation, FIG. 3 sets forth a diagram of an exemplary tire monitoring sensor (TMS) (300) for sensor auto-location using phased antenna array beamforming according to embodiments of the present disclosure. The TMS (300) includes a processor (301). The processor may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure.

The TMS (300) of FIG. 3 also includes a memory (303) coupled to the processor (301). The memory may store signal capture parameters (321) received from the VCS (200) or the TCU (500). The memory (303) may store a sampling rates table (322) of sampling rates at which the ADC (311) sampled accelerometric signals data from the accelerometer (307). The processor (301) may configure the ADC (311) in accordance with a stored sampling rate. The memory (303) may also store a windowing function table (323) of windowing functions for identifying road strikes from accelerometric data. The memory (303) may also store a filter table (324) of filter frequency bands with which to filter an accelerometric waveform. The memory (303) may also store accelerometric data (325), including a raw digital signal sampled from the accelerometer (307) by the ADC (311) and a processed accelerometric waveform processed by the processor (301). The memory (303) may also store tire data (326), such as a TMS identifier, a tire identifier (e.g., manufacturer make and model), manufacturer specifications for tire dimension (e.g., radius, circumference, width, aspect ratio, tread depth), a tire stiffness parameter, a tire mass parameter, and the like. The memory (303) may also store reference data (327) such as a reference circumference, a reference radius, a reference tire thickness, and/or a reference tread depth programmed by the manufacturer or received from the VCS (200) or the TCU (500) after an initial measurement of the tire when the tire is in a substantially original condition (i.e., when the tire is new).

For bidirectional wireless communication with the VCS (200), the TMS (300) of FIG. 3 includes a transceiver (305) coupled to the processor (301). In one embodiment, the transceiver (305) is a Bluetooth Low Energy transmitter-receiver. In other embodiments, the transceiver (305) may be other types of low energy bidirectional communication technology that is intended to conserve energy consumed in the TMS (300). The TMS (300) may transmit accelerometric data, tire velocity data, measured tire dimension data and reference data to the VCS (200) or TCU (500) via the transceiver (305). In an alternative embodiment, the TMS (300) includes a unidirectional transmitter configured to transmit data to the VCS (200), TPMS, mobile device, or some other component of a vehicle.

The accelerometer (307) of FIG. 3 may also be an acceleration sensor, an accelerometric device, a shock sensor, a force sensor, a microelectromechanical systems (MEMs) sensor, or other device that is similarly responsive to acceleration magnitude and/or to changes in acceleration, such that a tire revolution may be determined from the time between detected ground strike events. For example, an accelerometer senses acceleration in the radial plane (z-plane), lateral plane (y-plane), and/or tangential plane (x-plane), and outputs an electric pulse signal responsive to sensed acceleration, including but not limited to signals indicative of ground strikes. In an embodiment, the accelerometer (307) is configurable with an accelerometer range, a wheel speed parameter, or other vehicle parameter provided by the VCS (200). For example, g-offset can be determined via wheel speed sensor or another vehicle parameter and used to capture and process signals faster. Accelerometers may have a selectable range of forces they can measure. These ranges can vary from ±1 g up to ±700 g. An example range of an accelerometer is ±200 g. The accelerometer range may be configured based on wheel speed, for example, ±150 g at a low speed, ±250 g at a medium speed, and ±500 g at a high speed. Typically, the smaller the range, the more sensitive the readings will be from the accelerometer.

The TMS (300) of FIG. 3 also includes an analog to digital converter (ADC) (311) that receives the electric pulse signals from the accelerometer (307) and sampled accelerometric signals them according to a sampling rate. The ADC (311) converts the raw analog signals received from the accelerometer (307) into a raw digital signal that is suitable for digital signal processing.

The TMS (300) of FIG. 3 also includes a battery (309) connected to a power bus (not shown) to power the transceiver (305), the processor (301), the ADC (311), the accelerometer (307), and the memory (303). The TMS (300) may be powered by other sources alternative to or in addition to the battery (309), such as an energy harvester or other power source.

In some embodiments, in order to perform sensor auto-location using phased antenna array beamforming, each tire of a vehicle has a TMS (300) fitted and is mounted at one of four locations: front-left, front-right, rear-left, or rear-right. Although the following discussion describes sensor auto-location using phased antenna array beamforming with respect to four tires, it is understood that the approaches set forth herein may be applicable to vehicles with additional tires (e.g., a vehicle with three or more axles). The vehicle includes a phased antenna array such as the phased antenna array (400) of FIG. 4. The phased antenna array (400) includes an array of antennas (402) that create a beam that can be electronically steered in different directions without moving the antennas (402). A signal from a transmitter (404) is provided to each antenna (402), with each antenna (402) being activated in a particular sequence. Although the phased antenna array (400) is shown with a transmitter (404), in some embodiments, a transceiver is used such as the TMS transceiver (205) of the VCS (200). The power from the transmitter (404) is fed through phase shifters (406) controlled by a computer (408). As an example, the computer (408) includes the VCS (200) or components of the VCS (200), an ECU, and the like.

Figure 4:
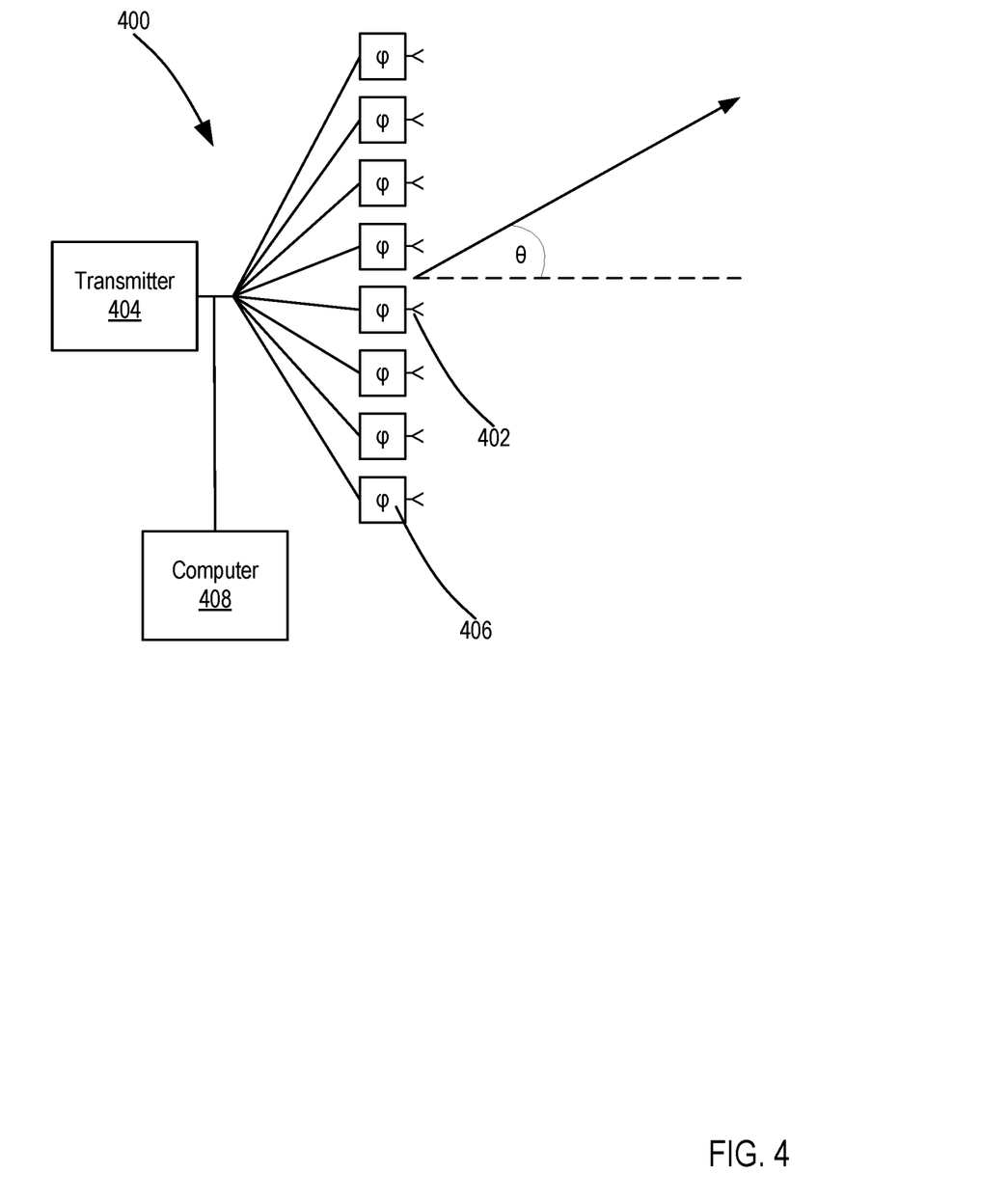
FIG. 4 is a diagram of an example phased antenna array for sensor auto-location using phased antenna array beamforming according to some embodiments of the present disclosure.
Figure 5:
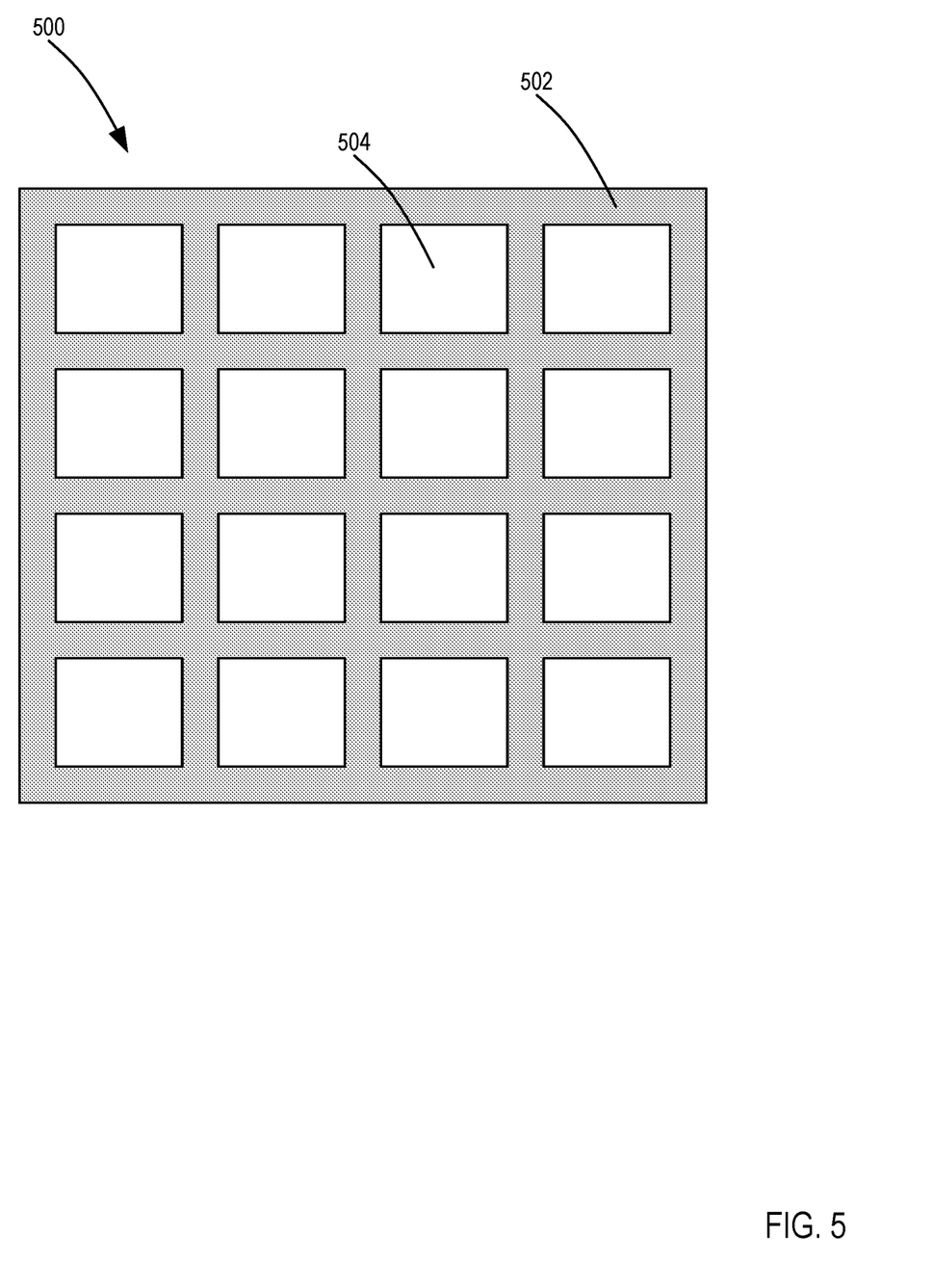
FIG. 5 is a diagram of an example antenna for sensor auto-location using phased antenna array beamforming according to some embodiments of the present disclosure.

Although the phased antenna array (400) of FIG. 4 is shown with a linear array of antennas (402), in some embodiments a planar antenna array is used. An example planar antenna array (500) is shown in FIG. 5. The planar antenna array (500) includes a printed circuit board (502) with a copper backplane. The planar antenna array (500) also includes copper patch antennas (504) arranged in a two-dimensional array. By using a planar antenna array (500), a signal may be directed across two dimensions or axes. In the following discussion, it is understood that references to a phased antenna array (400) and antennas (402) are also applicable to a planar antenna array (500) and copper patch antennas (504). Moreover, one skilled in the art will appreciate that, in some embodiments, a vehicle may use multiple phased antenna arrays (400) or planar antenna arrays (500).

Figure 6:
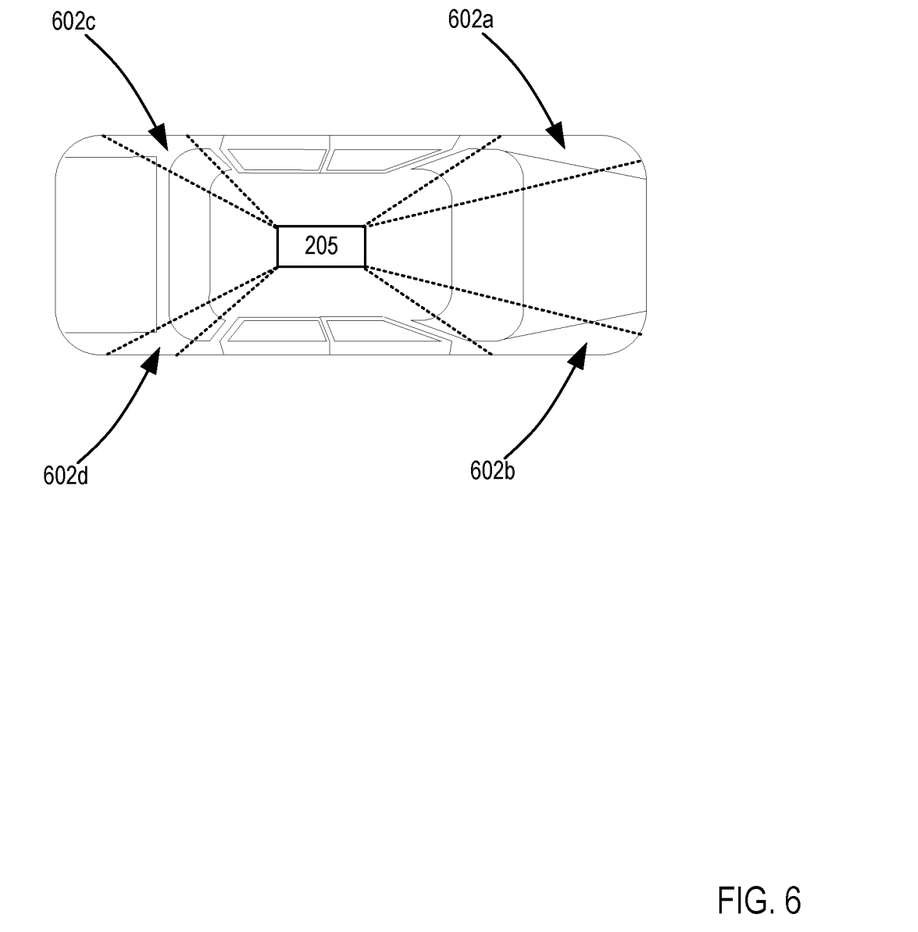
FIG. 6 is a diagram of example tire placement locations for sensor auto-location using phased antenna array beamforming according to some embodiments of the present disclosure.

In order for the phased antenna array (400) to send a beam in a specific direction to a particular tire location, the sequence in which each antenna (402) in the phased antenna array (400) should be activated must be known. In other words, for a given tire position in a given car, the particular activations sequence should be determined. Thus, assuming four different tire positions, four sequences need to be learned to send a beam in a direction for a particular tire. The four sequences for a given car can be stored in a VCS (200), an ECU, and the like. The determined sequence may then be used in other cars of the same type. Example beam directions are shown in FIG. 6, where a phased antenna array (400) can direct beams towards any of four tire placement directions: front left (602a), front right (602b), rear left (602c) and rear right (602d).

In addition to an activation sequence, a range of values for time of flight and Received Signal Strength Indicators (RSSIs) for signals received by the sensors at each tire location should be determined. When a beam is sent in a given direction, the RSSI and the time of flight for the signal received by each TMS (300) is collected. Beams are repeatedly sent to the TMS (300) for different rotational positions of the TMS (300) due to rotation of the tire (e.g., 0 degrees, 30 degrees, 60 degrees and so on). TMS (300) angle position resolution may vary for accurate results. RSSI and time of flight data is collected for each sensors at the various positions of the sensor. The recorded ranges for RSSI and time of flight for each sensor is stored in the ECU. These recorded ranges may also be used in other cars of the same type.

Given a known activation sequence and known ranges of RSSI and time of flight for each tire placement direction, in order to identify the particular TMS (300) at a particular tire placement direction, the ECU periodically sends a beam toward the particular tire placement direction via the phased antenna array (400). In response, the receiving TMS (300) provides an acknowledgement back to the ECU. In some embodiments, the acknowledgement includes a sensor identifier, a unique identifier for the TMS (300). In some embodiments, the acknowledgement includes the RSSI and time of flight as received by the TMS (300). In some embodiments, the sensor identifier, RSSI, and time of flight are sent by the TMS (300) as two or more separate signals or messages.

The ECU then determines whether the RSSI and time of flight fall within the predefined ranges for those attributes with respect to the given tire placement direction. In some embodiments, where these attributes fall within the predefined ranges, the ECU then determines that the receiving TMS (300) is fitted at the given tire placement direction. In some embodiments, the ECU repeatedly sends signals directed toward the given tire direction. Accordingly, in some embodiments, the ECU determines that the receiving TMS (300) is fitted at the given tire placement direction in response to a number of acknowledgements from the TMS (300) having the attributes within the predefined ranges meeting a threshold. In some embodiments, the threshold is relative to a time window (e.g., a number of acknowledgements received within a predefined time window). In some embodiments, the above process is repeated for each tire placement location in order to determine which TMS (300) is installed on tires at which tire placement direction. In some embodiments, after determining that a given TMS (300) is installed at a given tire placement direction, the ECU stores data associating the sensor identifier of the given TMS (300) with the given tire placement direction.

Figure 7:
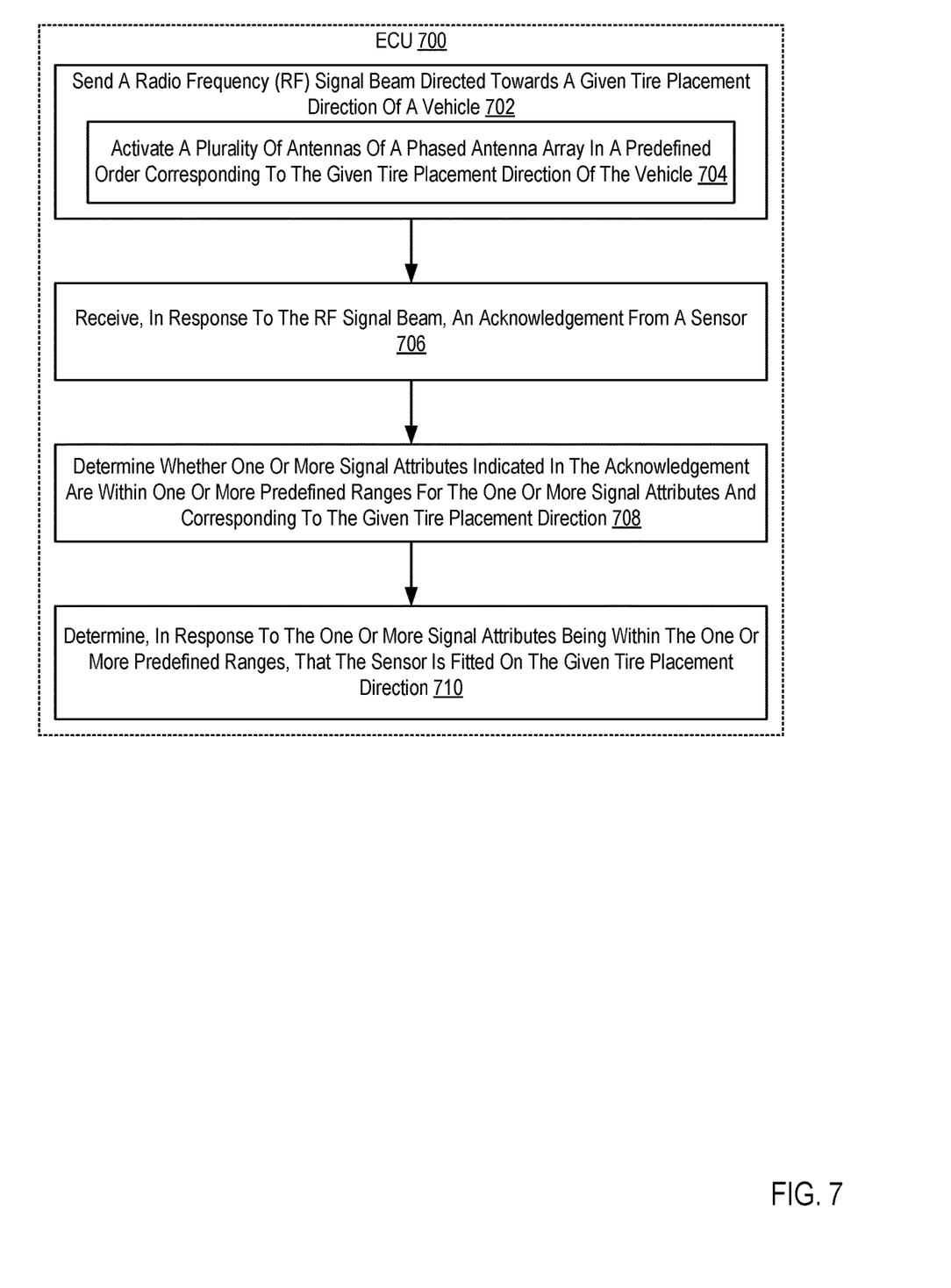
FIG. 7 is a flowchart of an example method for sensor auto-location using phased antenna array beamforming according to some embodiments of the present disclosure.

For further explanation, FIG. 7 sets forth a flowchart of an example method for sensor auto-location using phased antenna array beamforming according to some embodiments of the present disclosure. The method of FIG. 7 may be implemented in an ECU (700), such as the VCS (200) of FIG. 2. The method of FIG. 7 includes sending (702) a radio frequency (RF signal beam directed towards a given tire placement direction of a vehicle. In some embodiments, the RF signal beam is sent via a phased antenna array (400) having a plurality of antennas (402). Accordingly, in some embodiments, sending (702) the RF signal beam includes activating (704) the plurality of antennas (402) of the phased antenna array (400) in a predefined order corresponding to the given tire placement direction. As an example, assume that a particular activation sequence for each possible tire placement direction has been determined and is stored in the ECU. The ECU then activates the antennas (402) of the phased antenna array (400) according to the predetermined activation sequence.

The method of FIG. 7 also includes receiving (706), in response to the RF signal beam (e.g., via the phased antenna array (400) or another antenna or receiver), an acknowledgement from a sensor (e.g., a TMS (300)). In some embodiments, the acknowledgement includes a sensor identifier that serves as a unique identifier for the sensor. In some embodiments, the acknowledgement includes one or more attributes describing the RF signal beam as received by the sensor. For example, in some embodiments, the one or more attributes include an RSSI of the received RF signal beam. As another example, in some embodiments, the one or more attributes include a time of flight for the received RF signal beam.

The method of FIG. 7 also includes determining (708) whether one or more signal attributes indicated in the acknowledgement are within one or more predefined ranges for the one or more signal attributes and corresponding to the given tire placement direction. For example, assume that for each signal attribute (e.g., RSSI, time of flight), a range of values has been determined a priori for each given tire placement direction. The one or more signal attributes in the acknowledgement are then compared to their respective ranges to determine if they fall within their respective ranges.

The method of FIG. 7 also includes determining (710), in response to the one or more signal attributes being within the one or more predefined ranges, that the sensor is fitted on the given tire placement direction. Thus, the ECU is able to determine which tire sensors correspond to which tire placement directions quicker than existing approaches that require various data samples to be taken while the car in motion.

Figure 8:
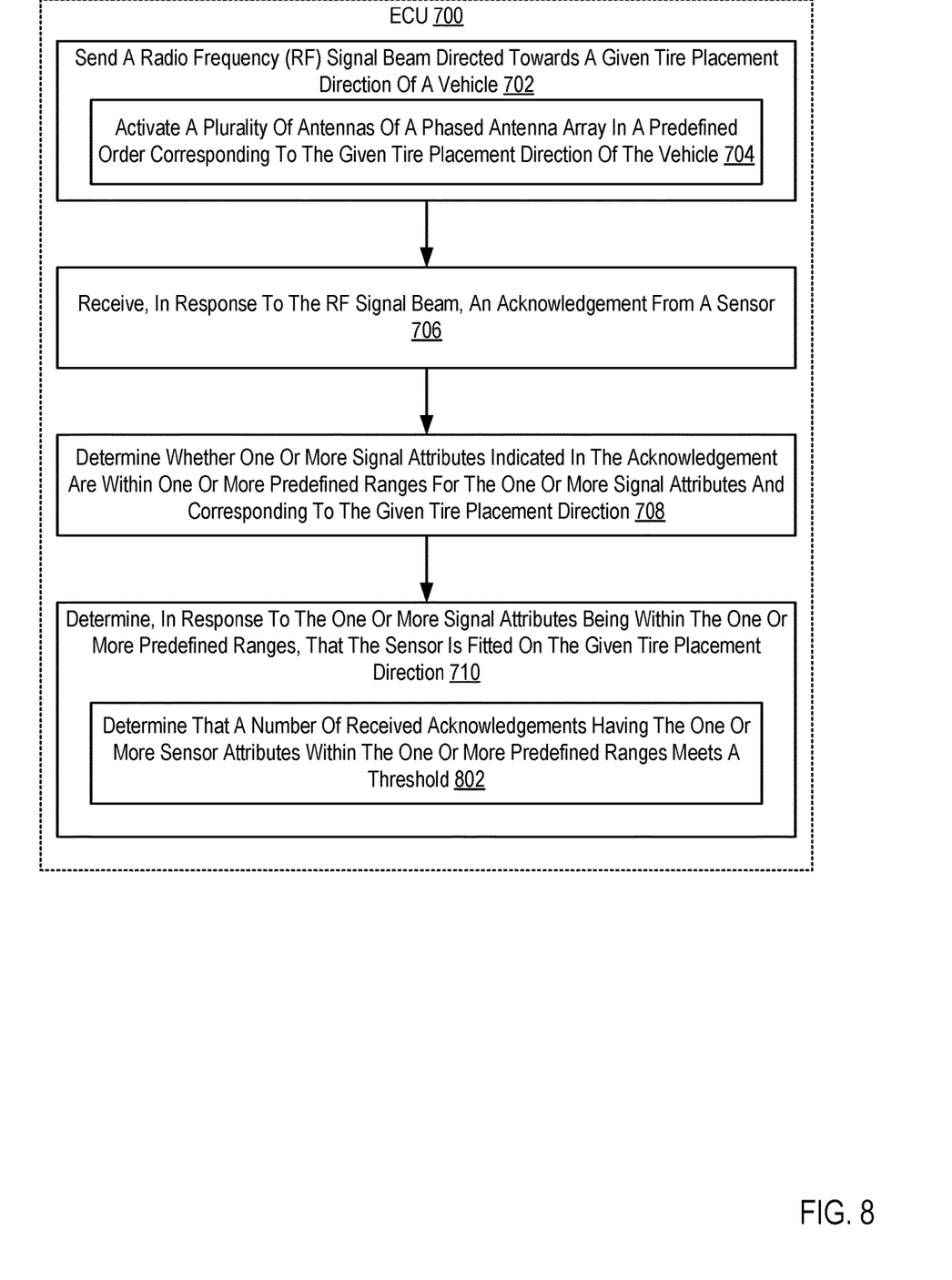
FIG. 8 is a flowchart of another example method for sensor auto-location using phased antenna array beamforming according to some embodiments of the present disclosure.

For further explanation, FIG. 8 sets forth a flowchart of an example method for sensor auto-location using phased antenna array beamforming according to some embodiments of the present disclosure. The method of FIG. 8 is similar to FIG. 7 in that the method of FIG. 8 includes sending (702) a radio frequency (RF signal beam directed towards a given tire placement direction of a vehicle, including activating (704) the plurality of antennas (402) of the phased antenna array (400) in a predefined order corresponding to the given tire placement direction; receiving (706), in response to the RF signal beam (e.g., via the phased antenna array (400) or another antenna or receiver), an acknowledgement from a sensor (e.g., a TMS (300)); determining (708) whether one or more signal attributes indicated in the acknowledgement are within one or more predefined ranges for the one or more signal attributes and corresponding to the given tire placement direction; and determining (710), in response to the one or more signal attributes being within the one or more predefined ranges, that the sensor is fitted on the given tire placement direction.

The method of FIG. 8 differs from FIG. 7 in that determining (710), in response to the one or more signal attributes being within the one or more predefined ranges, that the sensor is fitted on the given tire placement direction includes determining (802) that a number of received acknowledgements having one or more sensor attributes within the one or more predefined ranges meets a predefined threshold. For example, assume that the ECU sends multiple RF signal beams toward the given tire placement direction, receiving multiple acknowledgements in response. For each received acknowledgement, the ECU determines whether the signal attributes indicated in the received acknowledgement (e.g., RSSI, time of flight) falls within a corresponding range for the given tire placement direction. Where a number of the received acknowledgements whose signal attributes fall within the corresponding ranges meets the threshold, the ECU determines that the sensor from which the acknowledgments are received is fitted on a tire at the given tire placement location.

Figure 9:
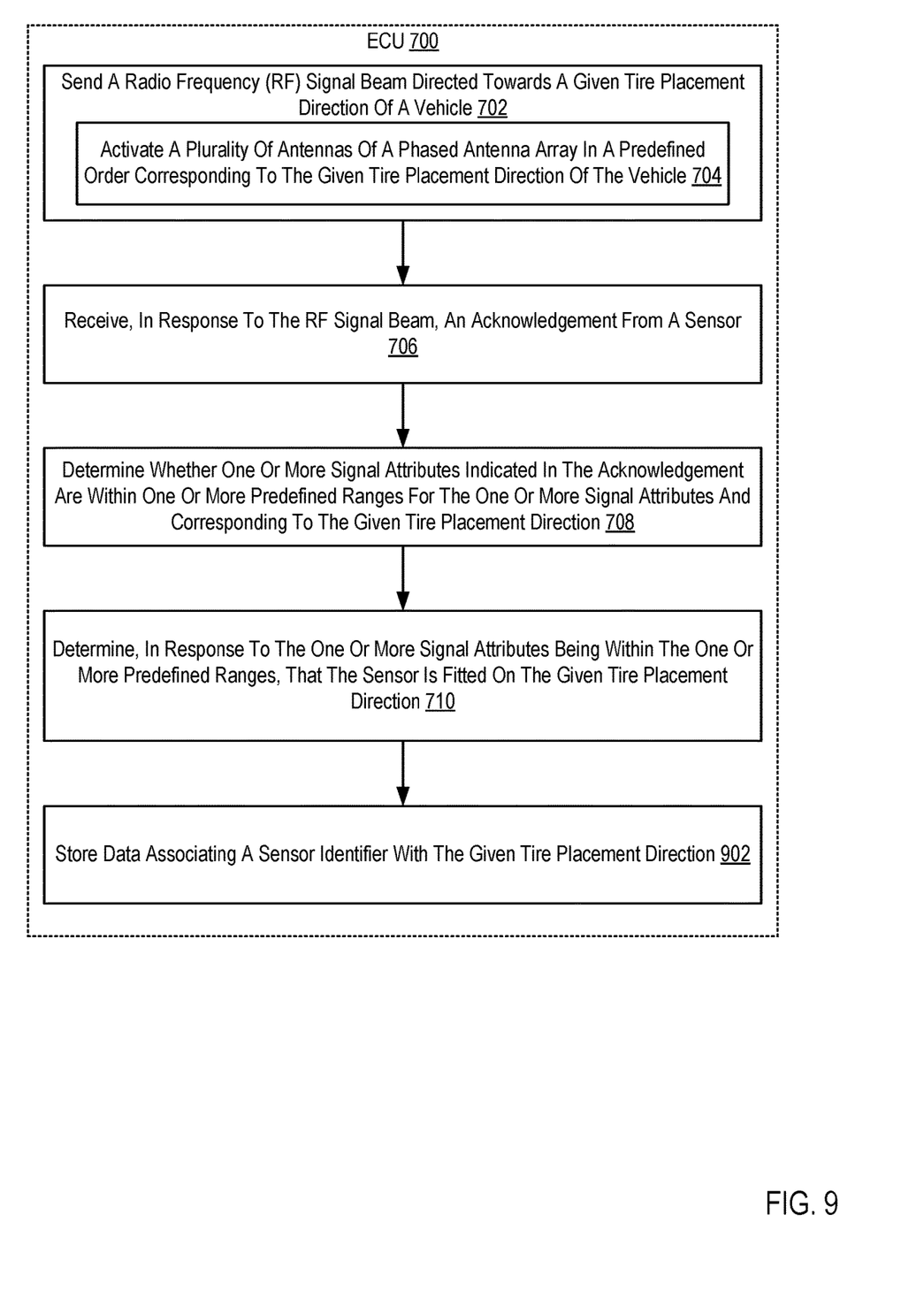
FIG. 9 is a flowchart of another example method for sensor auto-location using phased antenna array beamforming according to some embodiments of the present disclosure.

For further explanation, FIG. 9 sets forth a flowchart of an example method for sensor auto-location using phased antenna array beamforming according to some embodiments of the present disclosure. The method of FIG. 9 is similar to FIG. 7 in that the method of FIG. 9 includes sending (702) a radio frequency (RF signal beam directed towards a given tire placement direction of a vehicle, including activating (704) the plurality of antennas (402) of the phased antenna array (400) in a predefined order corresponding to the given tire placement direction; receiving (706), in response to the RF signal beam (e.g., via the phased antenna array (400) or another antenna or receiver), an acknowledgement from a sensor (e.g., a TMS (300)); determining (708) whether one or more signal attributes indicated in the acknowledgement are within one or more predefined ranges for the one or more signal attributes and corresponding to the given tire placement direction; and determining (710), in response to the one or more signal attributes being within the one or more predefined ranges, that the sensor is fitted on the given tire placement direction.

The method of FIG. 9 differs from FIG. 7 in that the method of FIG. 9 also includes storing (902) data associating a sensor identifier with the given tire placement direction. As is set forth above, the acknowledgement received from the sensor may include a sensor identifier. After determining that the sensor is fitted on a tire at the given tire placement direction, the ECU may store data associating the sensor identifier with the given tire placement direction. Thus, when data, signals, alerts, and the like are received from a given sensor, the ECU knows to which tire (e.g., which tire placement direction) the data corresponds.

Exemplary embodiments of the present disclosure are described largely in the context of a fully functional computer system for sensor auto-location using phased antenna array beamforming. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of sensor auto-location using phased antenna array beamforming, the method comprising:
storing, for each of a plurality of tire placement directions, a vehicle-specific antenna activation sequence corresponding to the tire placement direction;
storing, for each of the plurality of tire placement directions, one or more predefined ranges for one or more signal attributes, the one or more predefined ranges corresponding to the tire placement direction and including at least a Received Signal Strength Indicator (RSSI) range;
steering a radio frequency (RF) signal beam towards a given tire placement direction of a vehicle by activating two or more antennas of an antenna array in accordance with the antenna activation sequence corresponding to the tire placement direction;
receiving, in response to the RF signal beam, an acknowledgement from a sensor, the acknowledgement indicating one or more signal attribute values, the one or more signal attribute values including at least an RSSI value determined by the sensor;
determining whether one or more signal attribute values indicated in the acknowledgement are within the one or more predefined ranges for the one or more signal attributes and corresponding to the given tire placement direction, including determining whether the RSSI value is within the RSSI range for the given tire placement direction; and
determining, in response to the one or more signal attribute values being within the one or more predefined ranges, that the sensor is fitted on the given tire placement direction.

2. The method of claim 1, wherein the one or more predefined ranges includes a time of flight range corresponding to the tire placement direction; and wherein the one or more signal attribute values in the acknowledgement by the sensor comprises a time of flight value determined by the sensor.

3. The method of claim 1, wherein the RF signal beam is sent via a phased antenna array.

4. The method of claim 1, wherein determining that the sensor is fitted on the given tire placement direction comprises determining that a number of received acknowledgements having the one or more sensor attributes within the one or more predefined ranges meets a threshold.

5. The method of claim 1, wherein the acknowledgement from the sensor comprises a sensor identifier for the sensor, and the method further comprises storing data associating the sensor identifier with the given tire placement direction.

6. An apparatus for sensor auto-location using phased antenna array beamforming, the apparatus configured to perform steps comprising:
storing, for each of a plurality of tire placement directions, a vehicle-specific antenna activation sequence corresponding to the tire placement direction;
storing, for each of the plurality of tire placement directions, one or more predefined ranges for one or more signal attributes, the one or more predefined ranges corresponding to the tire placement direction and including at least a Received Signal Strength Indicator (RSSI) range;
steering a radio frequency (RF) signal beam towards a given tire placement direction of a vehicle by activating two or more antennas of an antenna array in accordance with the antenna activation sequence corresponding to the tire placement direction;
receiving, in response to the RF signal beam, an acknowledgement from a sensor, the acknowledgement indicating one or more signal attribute values, the one or more signal attribute values including at least an RSSI value determined by the sensor;
determining whether one or more signal attribute values indicated in the acknowledgement are within the one or more predefined ranges for the one or more signal attributes and corresponding to the given tire placement direction, including determining whether the RSSI value is within the RSSI range for the given tire placement direction; and
determining, in response to the one or more signal attribute values being within the one or more predefined ranges, that the sensor is fitted on the given tire placement direction.

7. The apparatus of claim 6, wherein the one or more predefined ranges includes a time of flight range corresponding to the tire placement direction; and wherein the one or more signal attribute values in the acknowledgement by the sensor comprises a time of flight value determined by the sensor.

8. The apparatus of claim 6, wherein the RF signal beam is sent via a phased antenna array.

9. The apparatus of claim 6, wherein determining that the sensor is fitted on the given tire placement direction comprises determining that a number of received acknowledgements having the one or more sensor attributes within the one or more predefined ranges meets a threshold.

10. The apparatus of claim 6, wherein the acknowledgement from the sensor comprises a sensor identifier for the sensor, and the steps further comprise storing data associating the sensor identifier with the given tire placement direction.

11. A non-transitory computer readable medium storing computer program instructions for sensor auto-location using phased antenna array beamforming that, when executed by a computer, cause the computer to perform steps comprising:
storing, for each of a plurality of tire placement directions, a vehicle-specific antenna activation sequence corresponding to the tire placement direction;
storing, for each of the plurality of tire placement directions, one or more predefined ranges for one or more signal attributes, the one or more predefined ranges corresponding to the tire placement direction and including at least a Received Signal Strength Indicator (RSSI) range;
steering a radio frequency (RF) signal beam towards a given tire placement direction of a vehicle by activating two or more antennas of an antenna array in accordance with the antenna activation sequence corresponding to the tire placement direction;
receiving, in response to the RF signal beam, an acknowledgement from a sensor, the acknowledgement indicating one or more signal attribute values, the one or more signal attribute values including at least an RSSI value determined by the sensor;

determining whether one or more signal attribute values indicated in the acknowledgement are within the one or more predefined ranges for the one or more signal attributes and corresponding to the given tire placement direction, including determining whether the RSSI value is within the RSSI range for the given tire placement direction; and determining, in response to the one or more signal attribute values being within the one or more predefined ranges, that the sensor is fitted on the given tire placement direction.

12. The non-transitory computer readable medium of claim 11, wherein the one or more predefined ranges includes a time of flight range corresponding to the tire placement direction; and wherein the one or more signal attribute values in the acknowledgement by the sensor comprises a time of flight value determined by the sensor.

13. The non-transitory computer readable medium of claim 11, wherein the RF signal beam is sent via a phased antenna array.

14. The non-transitory computer readable medium of claim 11, wherein determining that the sensor is fitted on the given tire placement direction comprises determining that a number of received acknowledgements having the one or more sensor attributes within the one or more predefined ranges meets a threshold.

* * * * *